United States Patent [19]

Yeomans

[11] Patent Number: 5,030,945

[45] Date of Patent: Jul. 9, 1991

[54] INTERACTIVE IMAGE DISPLAY

[75] Inventor: Andrew J. V. Yeomans, Hertfordshire, England

[73] Assignee: Crosfield Electronics Limited, London, England

[21] Appl. No.: 262,645

[22] Filed: Oct. 26, 1988

[30] Foreign Application Priority Data

Oct. 26, 1987 [GB] United Kingdom ............... 8725033

[51] Int. Cl.$^5$ .............................................. G09G 1/06
[52] U.S. Cl. .................................. 340/724; 340/727; 364/521
[58] Field of Search ............... 340/724, 924, 947, 710, 340/712; 364/518, 519, 521, 522; 382/46

[56] References Cited

U.S. PATENT DOCUMENTS

| | | | |
|---|---|---|---|
| 4,523,188 | 6/1985 | Huber | 340/724 |
| 4,701,752 | 10/1987 | Wang | 340/724 |
| 4,703,321 | 10/1987 | Barker et al. | 340/724 |
| 4,710,758 | 12/1987 | Mussler et al. | 340/724 |
| 4,755,809 | 7/1988 | Ikegami et al. | 340/724 |
| 4,903,012 | 2/1990 | Ohuchi | 340/724 |

FOREIGN PATENT DOCUMENTS 8706348 3/1987 United Kingdom ............... 340/724

OTHER PUBLICATIONS

Brewster Jon A., et al., A Friendly Unix Operating System User Interface, Hewlett-Packard Journal, Oct. 1985.

Gujar Uday G., et al., A Flexible Software Character Generator, Software—Practice and Experience, vol. 15(2), 191-218 (Feb. 1985).

Appel A., et al., Interactive Graphics Trajectory Design Method, IBM Technical Disclosure Bulletin, vol. 18, No. 10, Mar. 1976.

Primary Examiner—Jeffery A. Brier
Assistant Examiner—M. Fatahuyan
Attorney, Agent, or Firm—Sughrue, Mion, Zinn, Macpeak & Seas

[57] ABSTRACT

A method of and an apparatus for interactively controlling the display of an image on a monitor screen has the image stored in digital data form defining the color content of pixels of the image. The method includes displaying a representation of the image of the monitor screen; selecting a first point on the image and a first point on the monitor screen at which the first image point is to be located; selecting with a cursor a second point on the image; moving the cursor relative to the monitor screen; and, during the cursor movement, repeatedly adjusting the representation of the image displayed according to one or more predetermined algorithms so that the second image point remains coincident with the cursor position while the first image point is fixed at the first screen point.

6 Claims, 2 Drawing Sheets

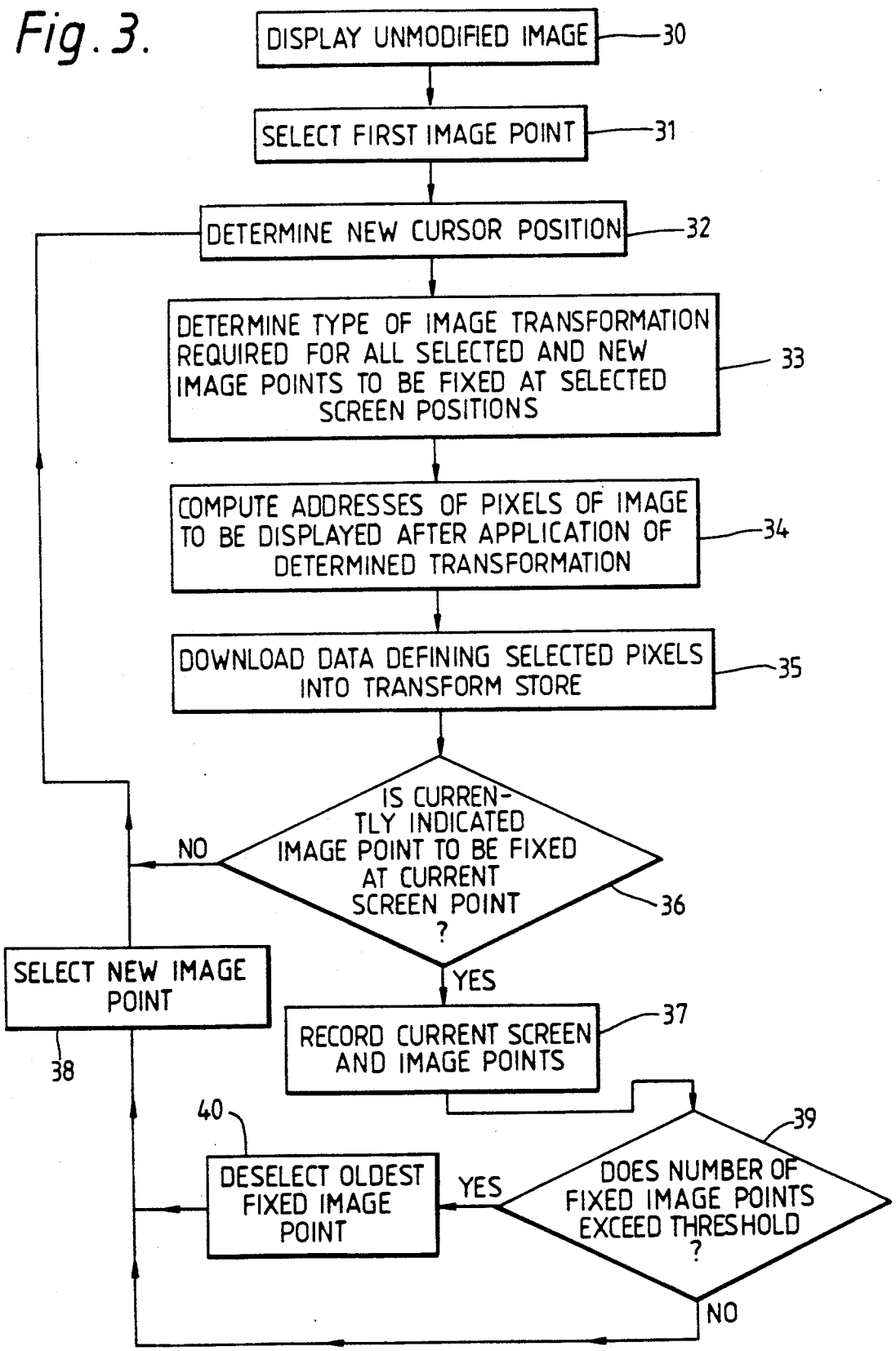

INTERACTIVE IMAGE DISPLAY

FIELD OF THE INVENTION

The invention relates to methods and apparatus for interactively controlling the display of an image on a monitor screen.

DESCRIPTION OF THE PRIOR ART

Current image modification systems, such as our Studio 800 system, allow an operator to view an image on a monitor screen, the original image being stored in digital form. The operator is then able to modify the shape of the image and its orientation by sending appropriate commands to a controlling computer. The effect of these modifications is then displayed on the monitor screen. In the past, in order to achieve image modifications such as lateral movement across the screen of the entire image, rotation of the image, or enlargement, contraction or perspective distortion of the image it has been necessary for the operator to enter the rotation angle or scale factor either numerically or by manipulating an analogue control (sometimes simulated using a digitizing tablet), after which the computer calculates the effect on the image and displays the resultant image form.

An alternative method used in the past is to define two points on the image, after which the computer calculates the appropriate enlargement factor so that the portion of the image between these points exactly fills a predefined rectangular shape.

The disadvantages of these methods are firstly that there is a significant time between the operator indicating the type of change he requires and the computer displaying the final form of the image; and secondly it is difficult to make small adjustments to the transformation to achieve the desired result, since only one parameter (rotation, enlargement, shear, perspective) is changed at a time. Also the operation of a numerical or analogue control does not always directly correspond to the modification required.

SUMMARY OF THE INVENTION

In accordance with one aspect of the present invention, a method of interactively controlling the display of an image on a monitor screen, the image being stored in the form of digital data defining the colour content of pixels of the image comprises
i) displaying a representation of the image on the monitor screen;
ii) selecting a first point on the image and a first point on the monitor screen at which the first image point is to be located;
iii) selecting with a cursor a second point on the image;
iv) moving the cursor relative to the monitor screen;
v) and during the cursor movement repeatedly adjusting the representation of the image displayed in accordance with one or more predetermined algorithms so that the second image point remains coincident with the cursor position while the first image point is fixed at the first screen point.

In a simple operation, the first screen and image points may already be coincident so that the movement of a second image point to a new screen point will result in a simple rotation or rotation and enlargement/contraction of the image. Thus, in this case, the algorithm applied to the remaining pixels of the image will be a conventional rotation algorithm possibly combined with an enlargement or contraction algorithm.

The method may further comprise selecting with the cursor a third point on the image and moving the cursor relative to the monitor screen, and during the cursor movement repeatedly adjusting the representation of the image displayed in accordance with one or more predetermined algorithms so that the third image point remains coincident with the cursor position while the first and second image points are fixed relatively to the screen.

Thus, after two image points have been correctly positioned, the choice of a third image point and subsequent cursor movement will result in an adjustment of the remainder of the image about the two points which are now fixed. Such an adjustment might comprise an enlargement or contraction or shear of the image.

This process can be continued with further points although in general when a predetermined number of image points have been selected, the selection of a further pair of image and monitor screen points will cause the deselection of the oldest pair of image and monitor screen points.

In some cases, step (ii) will comprise selecting the first image point with the cursor, moving the cursor relative to the monitor screen, and during the cursor movement continuously adjusting the representation of the image displayed in accordance with one or more predetermined algorithms so that the first image point remains coincident with the cursor position. This corresponds to a simple displacement of the image.

Typically, in order to achieve interactive display, the image will be displayed at a relatively low resolution. For example, if the monitor screen can display a highest resolution of n×m pixels, then the initial display may be at a resolution of n/4×m/4 pixels. This process is described in more detail in EP-A-0256816.

In accordance with a second aspect of the present invention, an apparatus for interactively controlling the display of an image on a monitor screen by carrying out a method in accordance with the first aspect of the invention, the image being stored in the form of digital data defining the colour content of pixels of the image, comprises a monitor having a monitor screen; a first store for storing the digital data defining the image; processing means; operator actuable control means to enable an operator to move a cursor relative to an image displayed on the monitor screen by the processing means; and a second store for storing a digital representation of the image to be displayed on the monitor screen, the processing means being responsive to signals from the operator actuable control means to cause a modified form of the image to be stored in the second store, the modified form of the image being generated by applying one or more of the predetermined algorithms to data from the first store.

Typically, the operator actuable control means will comprise a digitizing table and a manual element for moving across the table to cause a cursor symbol to move in a corresponding manner on the monitor screen. Alternatively, the operator actuable control means could comprise a light pen or similar instrument for moving directly across the monitor screen itself.

The processing means will typically comprise a computer.

BRIEF DESCRIPTION OF THE DRAWINGS

An example of a method and apparatus for interactively controlling the display of an image on a monitor screen in accordance with the present invention will now be described with reference to the accompanying drawings, in which:

FIGS. 2A-2G illustrate different monitor screen displays; and,

FIG. 3 is a flow diagram illustrating operation of the apparatus.

DETAILED DESCRIPTION OF AN EMBODIMENT

Figure 1:
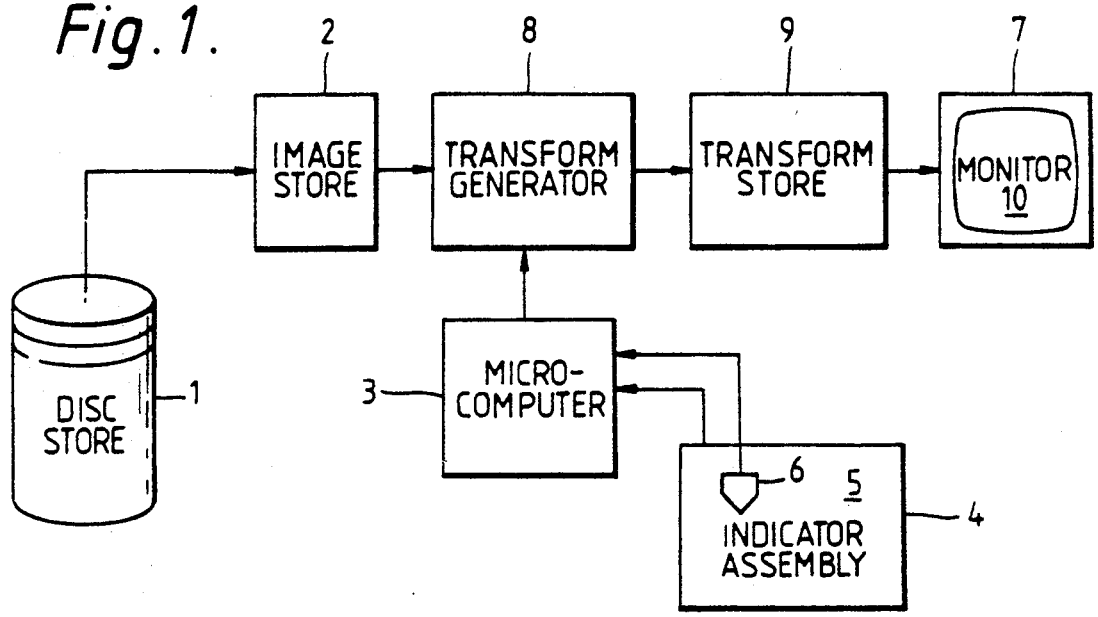
FIG. 1 is a block diagram of the apparatus.
Figure 1:
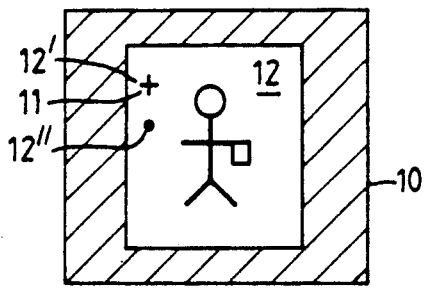
Figure 1:
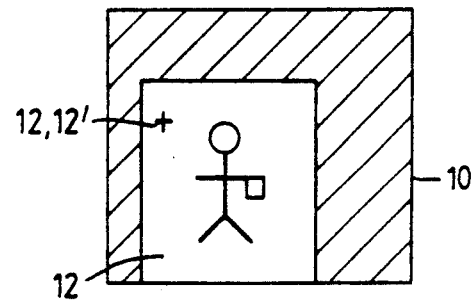
Figure 1:
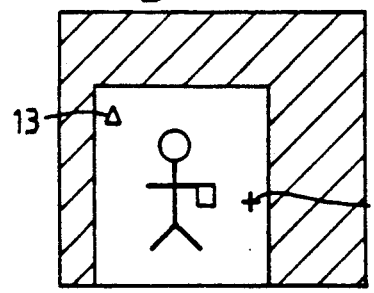
Figure 1:
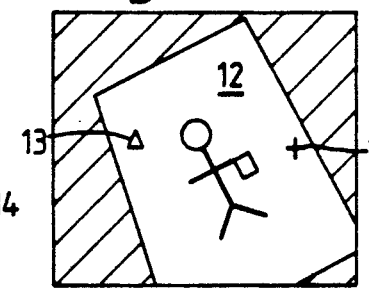
Figure 1:
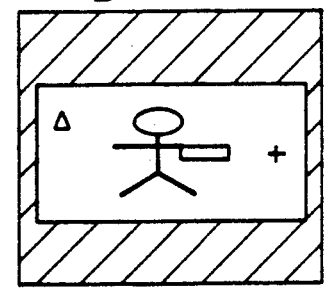
Figure 1:
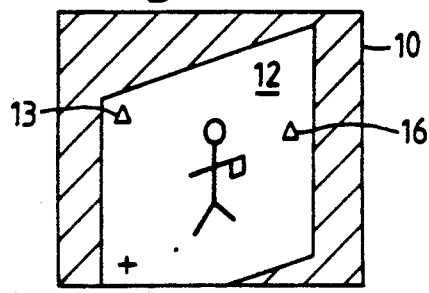
Figure 1:
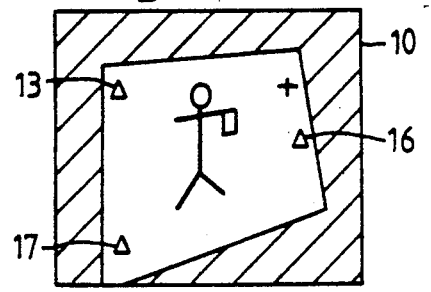

The apparatus shown in FIG. 1 comprises a disc store 1 which holds sets of digital data defining a number of images at a relatively high resolution, in a conventional manner. Thus, for each pixel of a coloured image, there will be four sets of digital data defining the intensity of each colour component, typically cyan, magenta, yellow, and black. The digital data defining a selected image can be loaded from the disc store 1 into a smaller image store 2 under the control of a microcomputer 3. An operator controls operation of the microcomputer 3 via an indicator assembly 4 such as a digitizing table 5 and cursor member 6.

The microcomputer 3 then controls the form of the image in the image store 2 to be displayed on a monitor 7 by suitably controlling address counters in a transform generator 8 with data defining certain transform algorithms. A simple algorithm could be rotation of the image through a certain angle with the resultant rotated form of the image being stored in a transform store 9 defining a two dimensional array corresponding directly on a one to one basis with pixels in the monitor screen 10 of the monitor 7. In addition, if the original image in the store 2 is defined in terms of four printing colour components (as previously mentioned) then the transform generator 8 will also convert the information to monitor colour components, typically red, green, and blue.

In operation, the operator initially requests the microcomputer 3 to display an unmodified form 12 of the image in the image store 2 on the monitor screen 10 (step 30, FIG. 3). This is shown in FIG. 2A. The operator then moves the cursor member 6 relative to the digitizing table 5 to cause a cursor mark 11 on the screen to move relative to the displayed image 12. The operator positions the cursor mark 11 at a particular position within the image 12 and this location 12' (first image point) is communicated and stored by the microcomputer 3 (step 31). The operator then moves the cursor 11 to a different part of the monitor screen 10. During this movement the position 12" (screen point) of the cursor relative to the screen is repeatedly communicated to the microcomputer 3 (step 32). The microcomputer 3 then continuously responds to each new cursor position by determining the type of image transformation required to adjust the representation of the image relative to the monitor screen 10 so as to bring the initially defined image point 12' into coincidence with the current cursor position 12" (step 33). In this initial case, the transformation will be a simple displacement or lateral movement. The displayed image 12 will thus be scrolled downwardly as shown in FIG. 2B as the cursor is moved. This is achieved by the microcomputer 3 determining which pixels of the original image should be displayed with the current cursor position (step 34) and causing the transform generator to address that pixel data which is downloaded into the correct locations in the transform store 9 (step 35).

The microcomputer then repeats steps 32 to 35 until the operator indicates that the image point 12' is to be fixed at the current point 12" (step 36). At this stage, these fixed positions are stored by the microcomputer 3 (step 37).

With the first image and screen points fixed as indicated by reference numeral 13 in FIG. 2C, the operator selects using the cursor a second image point 14 (step 38). The cursor is then moved relative to the screen and the microcomputer 3 responds to the current cursor position 15 (FIG. 2D) by calculating the transformation which must be made to the remainder of the image to allow the second image point to be brought into coincidence with the cursor position while the initial points remain fixed at the location 13 (steps 32-33). This transformation of the image could take one of a number of forms depending on the algorithms which the microcomputer 3 is allowed to apply. For example, if a rotation algorithm is provided while differential enlargement is not allowed, then the microcomputer 3 will cause the image 12 to rotate about the point 13. This is indicated in FIG. 2D. Alternatively, if rotation is not allowed but differential enlargement is allowed, this will result in a contraction of the image 12 in the vertical direction and an enlargement of the image in the horizontal direction as shown in FIG. 2E.

During movement of the cursor, the transformed images are displayed as previously described (steps 34-35) until the next fixed screen position is indicated and stored (steps 36-37).

Assuming that the image now displayed has the form shown in FIG. 2D, there will now be two fixed pairs of image and monitor screen points 13, 16. The selection of a third point in the image (step 38) and further movement of the cursor will result in the application by the microcomputer 3 of a shear algorithm in combination with the rotation algorithm and the lateral movement algorithm to generate a further series of pixel addresses in the store 2 which the transform generator 8 accesses to produce the display shown in FIG. 2F.

Finally, the selection of a fourth image point and subsequent movement of the cursor will result in the application of the previous three algorithms in combination with a perspective distortion algorithm in which the first, second, and third image points 13, 16, 17 remain fixed relative to the monitor screen 10.

After each image/screen point pair is fixed, the total number of such pairs is compared with a threshold (step 39) e.g. 4. When the threshold is exceeded the oldest screen/image point pair is deselected (step 40) prior to selection of the next image point.

Once the final desired form of the image has been achieved, the microcomputer 3 may update the information in the image store 2 to define the image in the final form.

The transformation algorithms have a conventional form and comprise one or more simultaneous equations which need to be solved, the number of equations depending on the number of fixed image/screen point pairs. For example, when four image points $(x_n, y_n)$ are to be transformed into points $(xt_n, yt_n)$, the transformation equations state that $$xt_n = (a \cdot x_n + b \cdot y_n + c)/(g \cdot x_n + h \cdot y_n + 1)$$

$$yt_n = (d \cdot x_n + e \cdot y_n + f)/(g \cdot x_n + h \cdot y_n + 1)$$

for n = 1, 2, 3, 4. This gives 8 simultaneous equations of the form:

$$a \cdot x_n + b \cdot y_n + c - g \cdot x_n \cdot xt_n - h \cdot y_n \cdot xt_n - xt_n = 0$$

$$d \cdot x_n + e \cdot y_n + f - g \cdot x_n \cdot yt_n - h \cdot y_n \cdot yt_n - yt_n = 0$$

which can be solved for a, b, c, d, e, f, g, h, in the usual way.

If fewer than 4 pairs of points are defined, some other constraints must be imposed to uniquely define the transformation. Suitable constraints are as follows:

| | |
|---|---|
| One point: | Translation only |
| Constraints: | b = d = g = h = 0 |
| | a = e = 1 |
| Solution: | c = $xt_1 - x_1$ |
| | f = $yt_1 - x_1$ |
| Two points: | (i) Rotation and uniform scaling (and translation) |
| Constraints: | g = h = 0 |
| | b = −d |
| | e = a |
| Solution: | a = [$(x_2 - x_1)(xt_2 - xt_1) + (y_2 - y_1)$ $(yt_2 - yt_1)$]/[$(x_2 - x_1)^2 + (y_2 - y_1)^2$] |
| | d = [$(x_2 - x_1)(yt_2 - yt_1) - (y_2 - y_1)$ $(xt_2 - xt_1)$]/[$(x_2 - x_1)^2 + (y_2 - y_1)^2$] |
| | c = $xt_1 - a.x_1 + d.y_1$ (= $xt_2 - a.x_2 + d.y_2$) |
| | f = $yt_1 - d.x_1 - a.y_1$ (= $yt_2 - d.x_2 - a.y_2$) |
| Two points: | (ii) Non-uniform stretch (and translation) |
| | Constraints: b = d = g = h = 0 |
| Solution: | a = $(xt_2 - xt_1)/(x_2 - x_1)$ |
| | e = $(yt_2 - yt_1)/(y_2 - y_1)$ |
| | c = $xt_1 - a.x_1 + d.y_1$ (= $xt_2 - a.x_2 + d.y_2$) = $(x_2.xt_1 - x_1.xt_2)/(x_2 - x_1)$ |
| | f = $yt_1 - d.x_1 - a.y_1$ (= $yt_2 - d.x_2 - a.y_2$) = $(y_2.yt_1 - y_1.yt_2)/(y_2 - y_1)$ |
| Three points: | General affine transformation |
| Constraints: | g = h = 0 |
| Solution: | By solving the six simultaneous equations given by n = 1, 2, 3: |
| | $a.x_n + b.y_n + c - xt_n = 0$ |
| | $d.x_n + e.y_n + f - yt_n = 0$ |

I claim:

1. A method of interactively controlling the display of an image on a monitor screen, the image being stored in the form of digital data defining the colour content of pixels of the image, the method comprising:
   i) displaying a representation of said image on said monitor screen;
   ii) selecting a first point on said image and a first point on said monitor screen at which said first image point is to be located;
   iii) selecting with a cursor a second point on said image;
   iv) moving said cursor relative to said monitor screen;
   v) and during said cursor movement repeatedly adjusting the representation of said image displayed in accordance with one or more predetermined algorithms so that said second image point remains coincident with said cursor position defining a second screen point while said first image point is fixed at said first screen point, wherein said image is displayed such that a relative disposition of displayed image points is adjusted so as to be similar to an adjustment in relative disposition between said first and second screen points.

2. A method according to claim 1, further comprising selecting with said cursor a third point on said image and moving said cursor relative to said monitor screen, and during said cursor movement repeatedly adjusting the representation of said image displayed in accordance with one or more predetermined algorithms so that said third image point remains coincident with said cursor position while said first and second image points are fixed relatively to said screen.

3. A method according to claim 2, wherein when a predetermined number of image points have been selected, the selection of a further pair of image and monitor screen points will cause the deselection of the oldest pair of image and monitor screen points.

4. A method according to claim 1, wherein step (ii) comprises selecting said first image point with said cursor, moving said cursor relative to said monitor screen, and during the cursor movement continuously adjusting the representation of said image displayed in accordance with one or more predetermined algorithms so that said first image point remains coincident with the cursor position.

5. An apparatus for interactively controlling the display of an image on a monitor screen, the image being stored in the form of digital data defining the colour content of pixels of the image, the apparatus comprising:
   a monitor having a monitor screen;
   a first store for storing said digital data defining said image;
   processing means;
   operator actuable control means to enable an operator to move a cursor relative to an image displayed on said monitor screen by said processing means; and
   a second store for storing the digital representation of said image to be displayed on said monitor screen, said processing means being responsive to signals from said operator actuable control means to cause a modified form of said image to be stored in said second store, said modified form of said image being generated by applying one or more of the predetermined algorithms to data from said first store, wherein said apparatus is adapted to carry out the steps of
   i) displaying a representation of said image on said monitor screen;
   ii) selecting a first point on said image and a first point on said monitor screen at which said first image point is to be located;
   iii) selecting with a cursor a second point on said image;
   iv) moving said cursor relative to said monitor screen;
   v) and during said cursor movement repeatedly adjusting the representation of said image displayed in accordance with one or more predetermined algorithms so that said second image point remains coincident with said cursor position defining a second screen point while said first image point is fixed at said first screen point, wherein said image is displayed such that a relative disposition of displayed image points is adjusted so as to be similar to an adjustment in relative disposition between said first and second screen points.

6. An apparatus according to claim 5, wherein said processing means comprises a suitably programmed computer.

* * * * *